United States Patent [19]

Pittinger et al.

[11] 4,250,623
[45] Feb. 17, 1981

[54] FILAMENT VEGETATION TRIMMER

[76] Inventors: Charles B. Pittinger; Cynthia A. Pittinger, both of Rt. 1, Box 68, Weatherford, Tex. 76086

[21] Appl. No.: 62,750

[22] Filed: Aug. 1, 1979

[51] Int. Cl.³ .............................................. A01D 50/00
[52] U.S. Cl. ...................................... 30/347; 56/295; 56/12.7
[58] Field of Search ................... 30/276, 347; 56/12.7, 56/295

[56] References Cited

U.S. PATENT DOCUMENTS

| | | | |
|---|---|---|---|
| 3,859,776 | 1/1975 | Ballas | 56/12.7 |
| 4,024,635 | 5/1977 | Mizuno | 30/276 |

FOREIGN PATENT DOCUMENTS 2756940  6/1979  Fed. Rep. of Germany ............. 30/276

*Primary Examiner*—Jimmy C. Peters

[57] ABSTRACT

An automatic development reel type cutter head for a filament trimmer comprises a circular base member having a circular array of post-like upstanding members and a filament coil disposed about selected of the post-like upstanding members and inside of the remaining post like members. The filament coil has a free end portion which is automatically deployed outwardly from the coil as the cutter head is rotated by a drive shaft upon which the cutter head is mounted against one of the post-like members so as to project radially outwardly therefrom. As one free end portion wears and breaks off as a result of frictional contact with the post-like member from which it projects, another free end portion is automatically deployed outwardly from another post-like member. In one embodiment of the invention a filament retainer plate is disposed over only those post-like members about which the filament is to be wound. After the filament is wound about the post-like members covered by the retainer plate, a cover plate is positioned over all of the post-like members. In another embodiment of the invention, the cutter head comprises a quick change cartridge having a core upon which the filament is wound which is detachably assembled with respect to the circular base member with the coiled filament positioned outside of certain of the post-like members and inside of others. In one embodiment the quick change cartridge has a smooth core while in another embodiment the quick change cartridge has a core with plural parallel grooves in which the filament is wound, and a switch over gap across the grooves for switching the filament between grooves. In some forms of the inventions a low grade bonding material coats the filament winding to hold the windings together.

12 Claims, 16 Drawing Figures

U.S. Patent   Feb. 17, 1981   Sheet 1 of 4   4,250,623
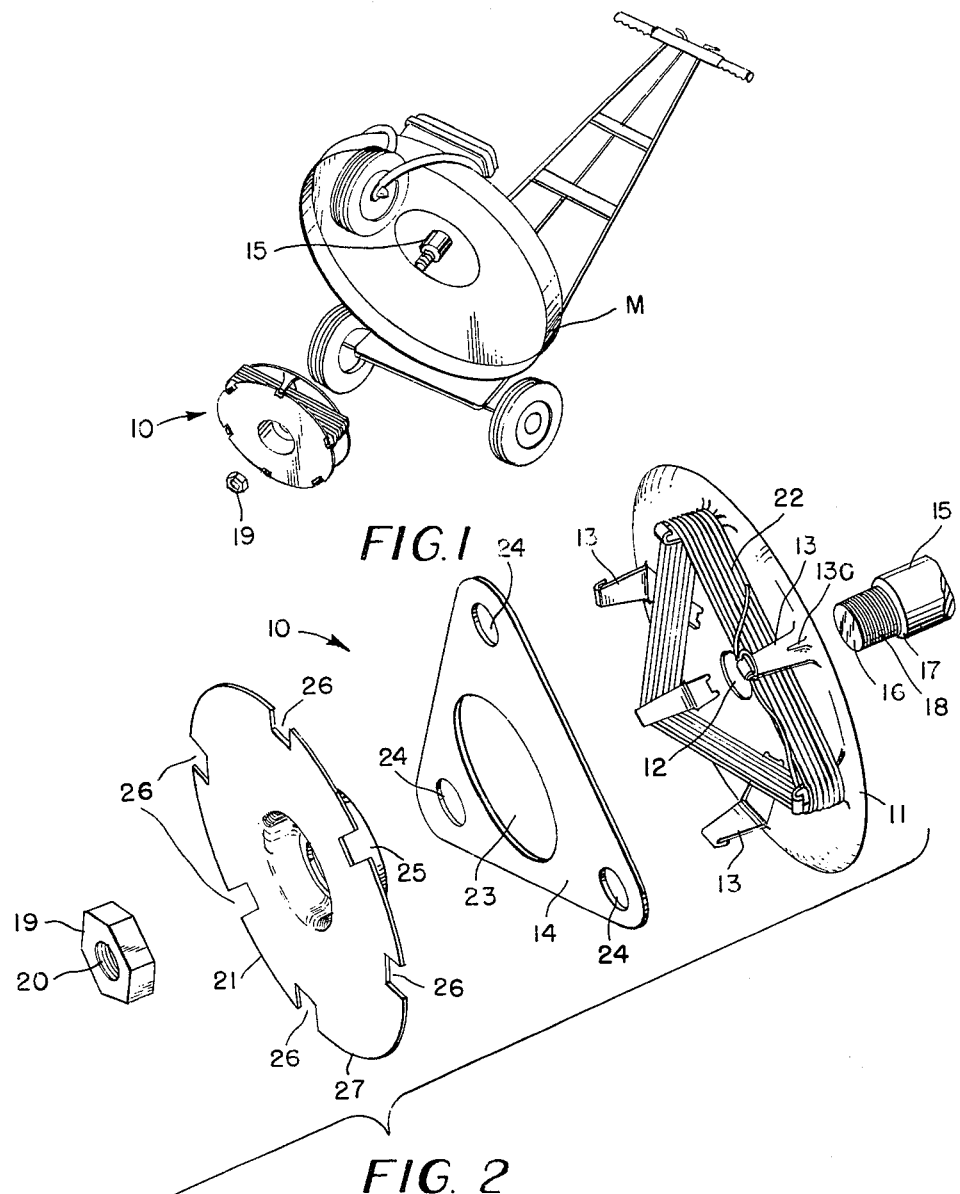
FIG. 1
FIG. 2
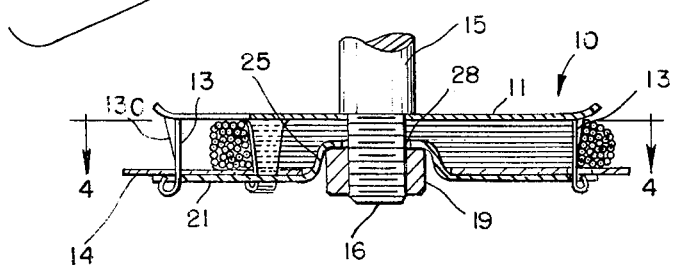
FIG. 3

FILAMENT VEGETATION TRIMMER

BACKGROUND OF THE INVENTION

This invention relates generally to filament type vegetation cutters and relates more particularly to improved automatic deployment cutter heads for same.

The present invention relates to improvements upon the vegetation filament cutter head disclosed in U.S. Pat. No. 4,020,553 issued May 3, 1977 to Cynthia Ann Pittinger for Filament Vegetation Trimmer with Basket Woven Automatic Feed Means and Method. The vegetation cutter head disclosed in the aforesaid patent will be referred to as a "basket" cutter head because it comprises a circular base having a plurality of upstanding members circumferentially spaced on the base, and a filament which is wound outside some of the upstanding members and inside others somewhat in the manner of a basket weave. A cover plate is mounted over top of the upstanding members and both the cover plate and the circular base have central holes therethrough for mounting upon the reduced end of a power driven shaft. The entire basket assembly is retained on the end of a drive shaft by a nut. In use, an outer end portion of the filament swings outwardly from one of the upstanding members as the basket is rotated and cuts grass and other vegetation which it encounters. Selected ones of the upstanding members have the filament bearing upon an inside edge thereof. The points of the filament where the filament engages the inside edge of the selected upstanding members are break points where the filament will break after considerable wear. Successive end portions of the filament break off at successive break points and a new end portion is automatically deployed outwardly to continue the cutting operation as the basket head is rotated. The automatic deployment of successive cutting portions of the filament wound upon the basket cage was an important advance in the art of filament trimmers obtained by the invention set forth in U.S. Pat. No. 4,020,553.

Since the filament which is loaded onto the basket style cutter head disclosed in U.S. Pat. No. 4,020,553, is woven onto the post-like members of the circular base, the loading of the basket style cutter head is usually performed by hand. Depending upon the size of the circular base the spacing between upstanding members on the base and the number of turns of filament woven onto the upstanding post-like members, the effort required for hand loading the basket style cutter head will vary and can involve considerable time expenditure.

SUMMARY OF THE INVENTION

This invention relates generally to improvements upon the cutter head disclosed in U.S. Pat. No. 4,020,553 whereby the disposition of filament windings relative to upstanding post-like members circumferentially spaced upon a circular base member is facilitated, so as to speed up the process of loading a cutter head with a new supply of filament once a cutter head filament supply becomes exhausted.

In one embodiment of this invention an automatic filament deployment reel-type cutter head comprises a circular base member having a circular array of post-like upstanding members. A filament is wound about selected of the post-like members between a filament retainer plate which covers only the post-like members about which the filament is wound and the base plate. The post-like members other than those about which the filament is wound, are located outside of the wound filament coil. A cover plate is provided over the filament retainer plate and over all of the upstanding post-like members. The base plate, filament retainer plate and the cover plate each have a central aperture for receiving the end of a drive shaft therethrough. The cutter head is secured on the end of a rotary drive shaft by a nut or by other suitable means.

In the aforesaid embodiment the winding of the filament about selected of the upstanding posts if facilitated by the use of a filament retainer plate which is shaped so as to cover only selected post-like members. The remaining post-like members are left uncovered by the retainer plate and a sufficient gap is provided between the retainer plate and the remaining post-like members so that a filament can be wound through the gap between the remaining post-like members and the retainer plate about the post-like members which are covered by the retainer plate.

In one form, the base plate has six upstanding members and the filament is would about three alternate post-like members. The retainer plate is triangularly shaped and has an aperture in each corner lobe of the triangle. The retainer plate fits over three alternate post-like members with the three alternate post-like members extending through the three apertures. The invention is not limited by the number of upstanding members on the base plate, and the example given is only by way of illustration.

In another embodiment, the invention comprises the circular base with upstanding post-like members described above together with a quick change cartridge containing the filament pre-wound thereon. The quick change cartridge is adapted to be assembled with the circular base and mounted on a drive shaft.

In one form the quick change cartridge has a multilobar core and spaced flanges on opposite sides of the core. The shape of the core is such that when the filament is wound thereon, and the cartridge is assembled with the circular base, the core and coil wound thereon will be located inside of selected ones of the upstanding post-like members and the other post-like members will extend through apertures located in the lobes of the core. The flanges of the cartridge have apertures located outside of the core for receiving therein the remaining post-like members of the circular base. The post-like members have on their free ends latching means for detachably latching the quick change cartridge assembled on said base.

The core of the quick change cartridge may be smooth to receive the successive filament windings thereon, or the core may be provided with a plurality of parallel grooves for separating the windings of each layer from each other. In the grooved core a slot extends across the grooves to provide a switching gap for switching the filament windings from one groove to another.

In another form the quick change cartridge includes a spool portion on which a filament is wound and a screw cap closing one end of the spool by which the quick change cartridge is screwed onto the threaded end of a drive shaft. The quick change cartridge including the spool portion and screw cap portion is adapted to be mounted on a drive shaft along with a circular base having upstanding post-like members. The circular base would be positioned first on the drive shaft and then the quick change cartridge would be located centrally with respect to the base and screwed onto the drive shaft clamping the base between the spool portion of the quick change cartridge and the drive shaft.

In order to keep the windings of the filament which are wound on the cores of the quick change cartridges or about selected upstanding post-like members of the circular base from sliding and becoming tangled and locked between and under each other, a low grade bonding coating of wax or other adhesive is applied to the filament coil. Instead of the wax or other adhesive coating an adhesive tape with low grade bonding strength can be applied to lock the windings in place.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 1 is an exploded perspective view showing one embodiment of the invention in position to be secured to the drive shaft of a mower/trimmer;

FIG. 2 is an exploded perspective view of the embodiment of the invention shown in FIG. 1;

FIG. 3 is a sectional view of the invention shown in FIG. 1 mounted on a drive shaft;

DETAILED DESCRIPTION

Figure 4:
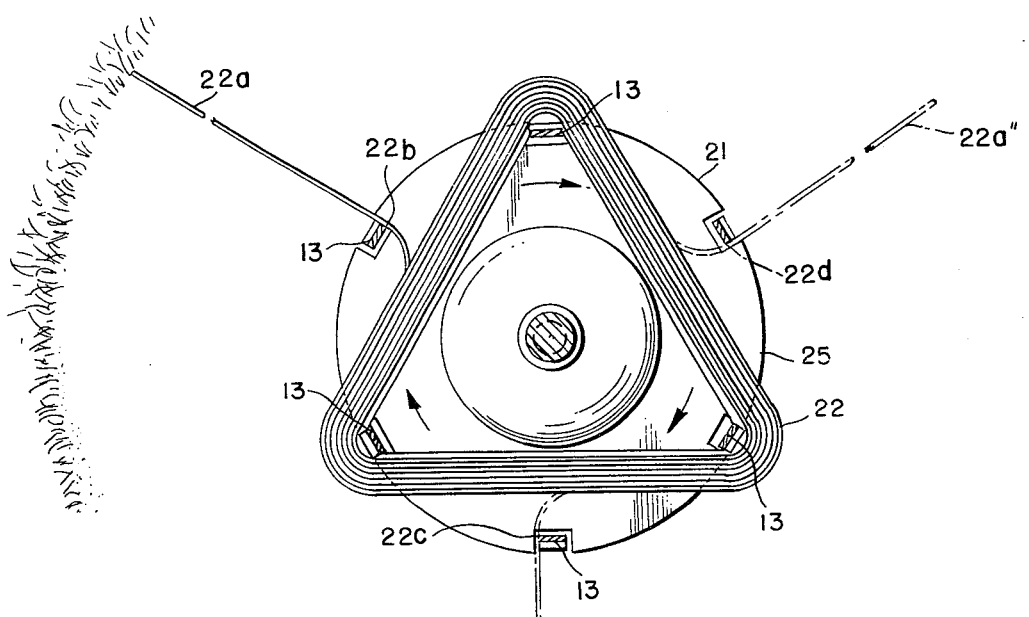
FIG. 4 is a sectional view taken on line 4—4 of FIG. 3.

Referring now to the drawings and particularly to FIGS. 1-6, one embodiment of the invention is generally indicated by the reference numeral 10. In the exploded view in FIG. 1, the filament cutter head 10 of this invention is shown in axial alignment with the drive shaft 15 of filament vegetation trimmer/mower M of a type disclosed in U.S. Pat. No. 4,077,191 issued Mar. 7, 1978 to Charles B. Pittinger Sr. and Charles B. Pittinger, Jr. The filament cutter head 10 is mounted upon the threaded reduced end 16 of the drive shaft 15 and is secured thereon by a threaded nut 19 or other suitable securement member.

As shown in the exploded view of FIG. 2, the cutter head comprises a circular base plate or disc 11 having a central aperture 12 for receiving the reduced end 16 of a drive shaft 15 and a plurality of circumferentially spaced post-like members 13 depending substantially perpendicularly from the plate, a triangular intermediate plate 14, a circular bottom cover plate 21 and a filament 22 woven about the depending post-like members 13 in a manner to be described. The intermediate plate 14 has a large central opening 23 and three smaller apertures 24 located in the three corners of the plate. The three corner apertures 24 are located to receive therein three of the members 13 about which the filament 22 is wound when the triangular intermediate plate 14 is aligned with the three posts and pushed toward the base plate 11. The cover plate 21 has a dished central hub 25 which projects inwardly through the large central opening 23 of the triangular plate 14 and plural peripheral notches 26 cut inwardly from the circular edge 27 of the cover plate. The notches 26 of the cover plate 21 correspond in number to the number of posts 13 depending from the base plate 11 and they are circumferentially spaced to receive the posts 13 therein when the cutter head is assembled as shown particularly in FIGS. 3, 4 and 6. The hub 25 of the cover plate 21 has a central aperture 28. The reduced end 16 of a drive shaft 15 is inserted through the central openings 12 and 28 of the base and cover plates 11 and 21 respectively until the shoulder 17 on the shaft 15, where the reduced end 16 is connected to the remainder of the drive shaft, seats against the base plate, and the threaded end 18 of the reduced end portion 16, projects through the opening 28 in the hub 25 of the cover plate. A nut 19 having a threaded opening 20 is screwed onto the threaded end 18 of the shaft 15 and secures the cutter head 10 on the shaft. While the shaft 15 is shown in FIG. 1 to be that of a mower/trimmer of the type shown in U.S. Pat. No. 4,077,191, the shaft may be driven by any suitable source of power.

Figure 5:
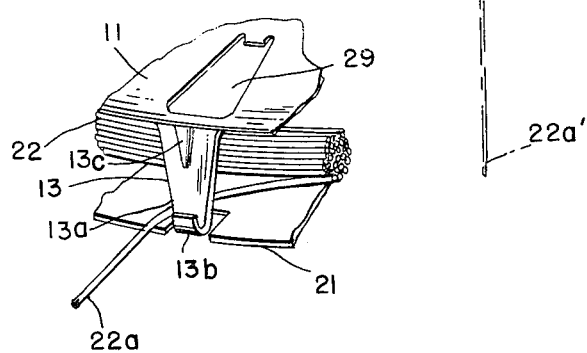
FIG. 5 is an enlarged fragmentary perspective view of a portion of the invention shown in FIG. 2.
Figure 6:
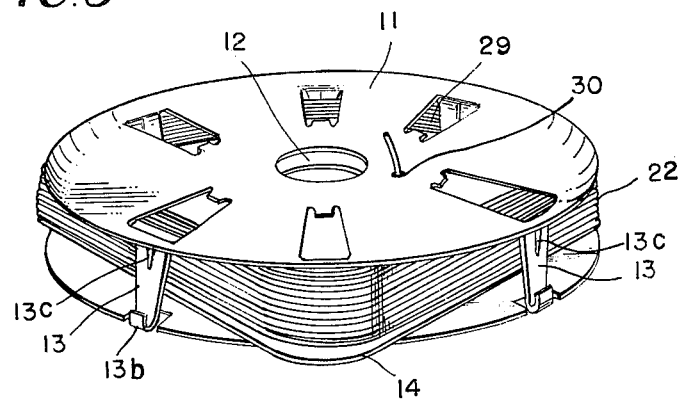
FIG. 6 is a perspective view of the cutter head shown in FIG. 2.

As best seen in FIGS. 2, 5 and 6, the post-like members 13 are preferably formed by stamping them with a die from the base plate 11 and bending them perpendicular to the base plate all in one direction leaving openings 29 in the base. Each post 13 preferably has a medial reinforcing rib 13c extending from adjacent the juncture of the post with the plate 11 toward its free end which is rolled as indicated at 13b (See FIG. 5). The post-like members 13 are preferably circumferentially spaced equal distances from each other and from the center of aperture 12. The members 13 serve the purpose of supporting the cutter filament 22 which may be of any desired length and is provided with a projecting cutter portion 22a. One end of the filament 22 is secured to the base plate in a suitable manner, such as by inserting it through a hole 30 and knotting the end. The filament is then wound outside of selected of the post-like members 13 and inside others. With the six-post cutter head shown in FIGS. 1-6, the filament is wound outside alternate posts and inside of the other posts leaving a free end cutter portion 22a of a desired length which passes inside of and projects outwardly from one of the posts 13. The point where the free end cutter portion bears against the edge of a post 13 and extends outwardly therefrom is designated a break point. The posts 13 of the cutter head 10 which are located outside of the triangular coil of the filament 22 (FIG. 4) provide successive break points as one free end cutter portion breaks off and another free end cutter portion is automatically deployed in the manner described in U.S. Pat. No. 4,020,553.

The procedure for preparing the filament cutter head 10 for use comprises first taking the circular base plate 11 in one hand with the posts 13 up and securing one end of the filament 22 to the base plate through the hole 30. The triangular intermediate plate 14 is then positioned over three of the post-like members 13 so that the free ends of the members 13 extend through the corner apertures 24 of the triangular plate. The filament 22 is then wound about the outside of the three post-like members 13 which extend through the corner apertures 24 of the intermediate plate and inside of the remaining members 13. The plate 14 provides a flange that contains the filament 22 between the base plate 11 and the intermediate plate 14 as the filament is wound, keeping the filament from sliding off the ends of the three posts and making winding new filament very rapid. After winding a desired length of filament, one hundred feet for example, about the three posts 13 which extend through the plate 14, the cover plate 21 is placed over the plate 14 with notches 26 aligned with posts 13 and it is pushed down over the posts 13, so that the hub 28 extends through the control opening 23 of the triangular plate 14. The cutter head 10 is then inverted and installed on the end of a drive shaft 15 in the manner shown in FIG. 3.

While the base plate has been shown as having six posts 13, it is not intended that the invention be limited by the number of post-like members 13 extending from the base plate. For example, if a base plate 11 is provided with eight posts 13, an intermediate plate 14 with four corners and four corner apertures 24 would be substituted for the triangular intermediate plate shown. Filament 22 would be wound about four alternate posts and deployed from the other four posts.

The base plate may also have an odd number of posts, in which case a progressive or advancing/retarding overlap winding results. If the base plate has an even number of posts, such as six or eight, a repeating or non-overlap results.

The length of the post-like upstanding members 13 may be of any desired height so that any desired number of filaments may be wound about them with one end of each filament secured to the base plate 11 and one cutting portion 22a preferably projecting from the cutter head at spaced radial intervals, thus providing for faster and more effective cutting than where a single projecting portion is provided.

The cutting operation of the cutter head 10 is similar to the cutting action of the cutter head disclosed in U.S. Pat. No. 4,020,553. Assuming that the filament 22 has been wound about the members 13 in the manner previously described with a cutter portion 22a projecting from the cutter head as indicated in FIGS. 4 and 5 and with the filament engaging an edge 13a of one of the members 13 at point 22b, the cutter head is rotated through the drive shaft 15 by the motor of the trimmer/mower M or other suitable means. After a period of time, the filament 22 is worn against the edge 13a and a breakage of the filament occurs at the point 22b referred to as the first break point, thereupon the portion of the filament between the first break point and the second break point 22c is swung clear of the cutter head by centrifugal force and the portion of the filament between these two break points 22b and 22c will then serve as a cutting element 22a' similar to the portion 22a previously described. After a further period of use, breakage of the filament will again occur at the second break point 22c, after which the portion of the filament between the second break point 22c and the third point 22d will swing clear of the intermediate elements 13 and the portion 22a" will then function as a cutting element similar to the original cutting portion 22a.

The filament 22 may be formed of any suitable material including natural and synthetic fibers, the latter including nylon, which is strong and is preferably employed. Metal fibers make effective cutters for vegetation but ordinarily will not be used since there may be danger to the operator of the cutting apparatus.

The filament windings are preferably impregnated or coated with wax, or an adhesive or adhesive tape to hold them locked in place. Without the coating, the filament can "bird nest" and then get tangled and lock between and under each other. The low grade bonding or locking by the wax or adhesive coating or adhesive tape will prevent the filament windings from becoming tangled.

Figure 7:
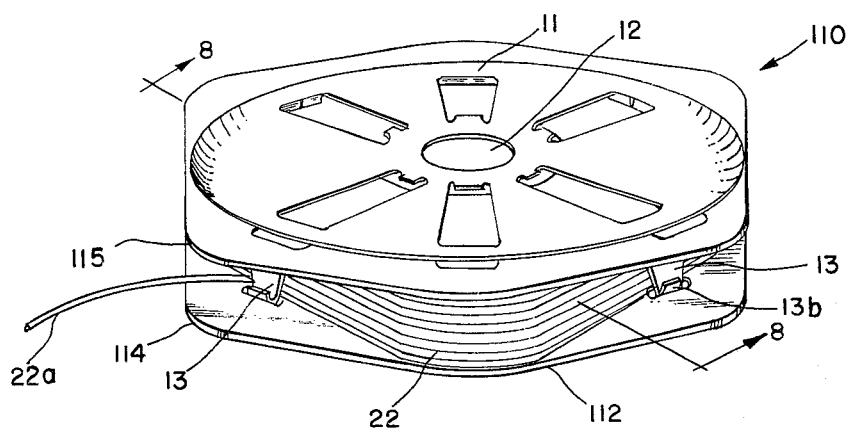
FIG. 7 is a perspective view of another embodiment of the invention.
Figure 8:
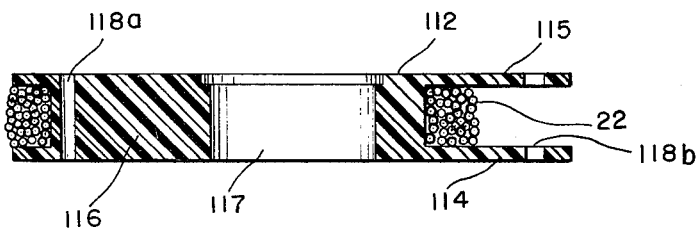
FIG. 8 is a sectional view taken on line 8—8 in FIG. 7 through the reel portion of the invention shown in FIG. 7.
Figure 9:
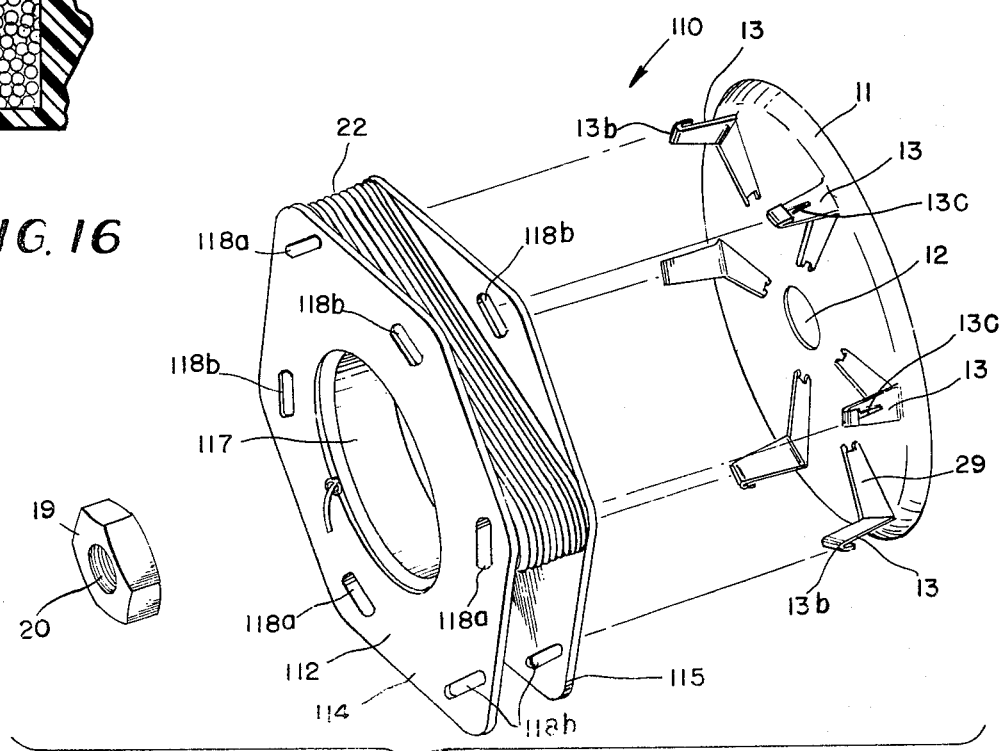
FIG. 9 is an exploded perspective view of the invention shown in FIG. 7.

Referring now to FIGS. 7–9 another improved filament type vegetation cutter head 110 is shown. Looking particularly at the exploded view in FIG. 9, the cutter head 110 is seen to comprise a circular base plate 11 corresponding to the base plate 11 of the cutter head 10 shown in FIGS. 1–6 and a quick change self-contained cartridge 112 upon which a cutter filament 22 is wound. The base plate 11 has already been described in connection with the cutter head 10 and needs no further description.

The quick change cartridge 112 comprises a spool having spaced, parallel flanges 114 and 115 integral with a trilobular core of generally triangular configuration about which the filament 22 is wound. The flanges 114 and 115 serve as retainers to hold the filament on the core 116. The cartridge 112 has a central opening 117 and six apertures designated 118a and 118b which are circumferentially spaced an equal distance from each other and which are radially spaced an equal distance from the center of the opening 117. Three of the apertures 118a pass through the flanges 114 and 115 and through the core 116 in the lobes thereof; the remaining three apertures 118b pass through the flanges 114 and 115 outside of the core 116.

The position of the apertures 118a and 118b in the cartridge 112 relative to the center of the cartridge corresponds with the position of the upstanding members 13 on the base plate 11 relative to the center thereof and each of the apertures 118a and 118b is of a size and shape to receive one of the posts 13. The quick change cartridge 112 is assembled on the base plate 11 by coaxially aligning the cartridge in front of the base plate so that the openings 118a and 118b are aligned with the upstanding post-like members 13 as shown in FIG. 9 and then pushing the cartridge 112 toward the base plate 11. The post-like members 13 pass through the apertures 118a and 118b and the ends of the posts, which are provided with a rounded reverse bend indicated at 13b, snap over the edge of the outermost flange 114 surrounding the apertures and secure the cartridge 112 and the base plate 11 in assembled condition as shown in FIG. 7. The assembled cutter head 110 may then be mounted on a rotary drive shaft 15, the same as shown in FIG. 2, by holding the cutter head 110 so that the base plate 11 faces the drive shaft and then pushing the cutter head onto the drive shaft through the opening 12 until the base plate surrounding the hole 12 abuts the shoulder 17 of the drive shaft and the threaded end 18 extends through the central opening 12. The nut 19 may then be screwed onto the drive shaft 15 through the enlarged opening 117 in the cartridge until it tightens the base plate 11 against the shoulder 17 of the drive shaft.

The use of the quick change cartridge 112 in combination with the base plate alleviates the necessity of hand winding the filament 22 about selected ones of the post-like members 13 as is required with the basket cutter head disclosed in U.S. Pat. No. 4,020,553 and also is required with the improved cutter head 10 of this invention. When the cartridge 112 with the filament 22 wound thereon about the trilobar core 116, is assembled with the base plate 11 as has been previously described, three alternate upstanding post-like members 13 are automatically positioned inside of the coiled filament 22, and another three alternate upstanding post-like members 13 are positioned outside of the coiled filament 22. The post-like members 13 which are outside of the coiled filament 22 provide successive break points for the cutter filament 22 in the same manner as described with respect to the cutter head 10, shown in FIGS. 1-6. First, one cutter end portion 22a of the filament 22 is deployed outwardly from one of the members 13 as the cutter head 110 rotates and engages an edge of the member 13, and then, after the first cutter end portion 22a breaks off as the result of wear, another cutter end portion is automatically deployed outwardly from the next member 13, that is located outside of the coiled filament 22, and so on in succession until the filament coil is finally exhausted. The depleted quick change cartridge 112 can then be disassembled from the base plate 11 simply by pulling the cartridge 112 away from the base plate 11 while the base plate remains attached to the drive shaft of a cutter apparatus such as the mower/trimmer M shown in FIG. 1. The upstanding members 13 are sufficiently resilient to spring inwardly toward the center of the base plate 11 as a separating force is applied to the cartridge to allow the ends 13b of the members 13 to clear the edges of the flange 114 surrounding the apertures 118a and 118b. Once the depleted cartridge 112 is removed a full cartridge 112 can then be snapped onto the base plate 11 in a manner previously described.

The cartridge 112 is preferably made of a molded synthetic resin having the required durability, or it may be made of metal or other suitable material meeting predetermined strength requirement.

While the cartridge 112 is shown and described as having six circumferentially spaced apertures 118a and 118b and as having a trilobar core for use with the base plate 11 which is shown as having six upstanding post-like members it is to be understood that a cartridge 112 can be designed for use with a base plate 11 having more or less upstanding members 13 as long as there are in the assembled cutter head certain of the upstanding members which remain outside of the coiled filament which serve as posts against which successive cutter end portions, such as 22a are engaged as they are deployed outwardly by centrifugal force as the cutter head is rotated.

Filament 22 of a desired length can be wound on the cartridge 112 by hand or by machine. Preferably the wound filament is coated or impregnated with wax, or an adhesive, or adhesive tape to hold the windings locked in place in a manner as has been previously described.

Figure 10:
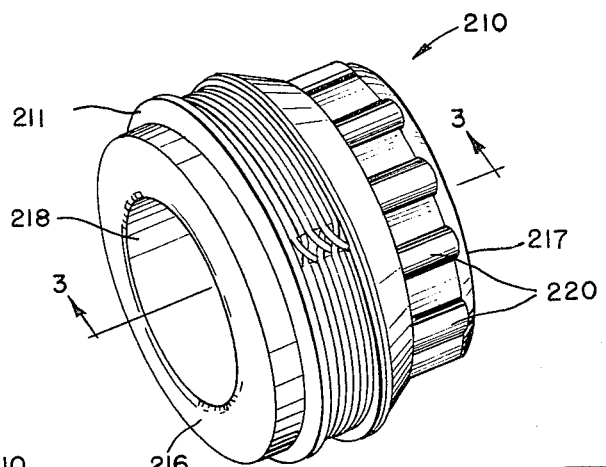
FIG. 10 is a perspective view of still another embodiment of a cutter head quick change cartridge.
Figure 11:
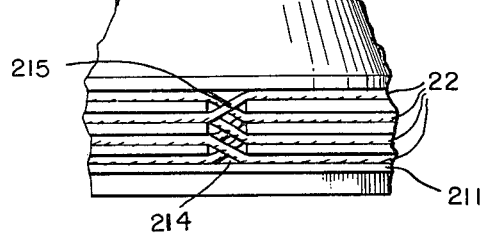
FIG. 11 is a fragmentary elevational view of a portion of the quick change cartridge shown in FIG. 10.
Figure 12:
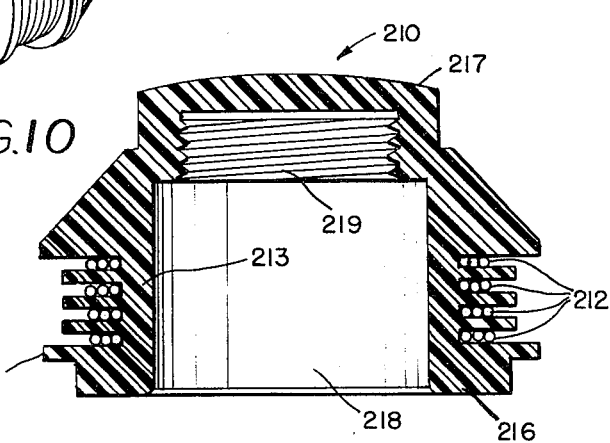
FIG. 12 is a sectional view taken on line 3—3 of FIG. 10.

In FIGS. 10-12 still another embodiment 210 of the invention is shown which comprises a spool 211 having a plurality of parallel circumferential channels or grooves cut into the core 213. A filament 22 is wound in superimposed layers or windings within the channels 212. Each channel 212 has a width only slightly greater than the diameter of the filament which is wound therein thus preventing successive turns of the filament from being jammed side by side in the channel. The depth of each channel is sufficient to receive a number of superimposed windings of the filament 22. A longitudinal slot 214 extends across the channels 212 providing a gap whereby successive windings of the filament may be crossed over from one channel to the next as indicated at 215. The purpose of the channels 212 is to prevent the filament turns from jamming down between each other and causing transient feeding delays.

The spool 211 has an open end 216 and a closed end 217. An enlarged central cylindrical bore 218 extends inwardly from the open end 216, and an interiorly threaded bore 219 of reduced diameter is provided as a coaxial extension of the enlarged bore 218 at the closed end. The closed end 217 is formed as a cylindrical cap for the spool 211 and it is provided with longitudinal flutes 220 about the periphery thereof to serve as a hand grip by means of which the spool 211 may be screwed onto the end of a threaded drive shaft such as the drive shaft 15 shown in FIG. 2.

The cutter head member 210 is adapted for use with a base plate 11, previously described, having a selected number of upstanding post-like members. The base plate 11 would be first positioned on a drive shaft 15 with its upstanding posts 13 extending outwardly away from the drive shaft. The cutter head member 210 would then be screwed onto the reduced end 18 of the drive shaft until the open end 216 of the spool 211 seats against the base plate 11 and the member 210 is tightly secured onto the end of the drive shaft.

The spool 211 would be located inside of the upstanding members 13 on the base plate 11 and as the cutter head member 210 is rotated, an end portion of the filament 22 wound on the spool 211 would be deployed outwardly against one of the post-like members 13 in a manner previously described in connection with the cutter heads 10 and 110. As soon as one cutter end portion of the filament wears and breaks off, another cutter end portion wound be deployed outwardly to take its place.

Figure 14:
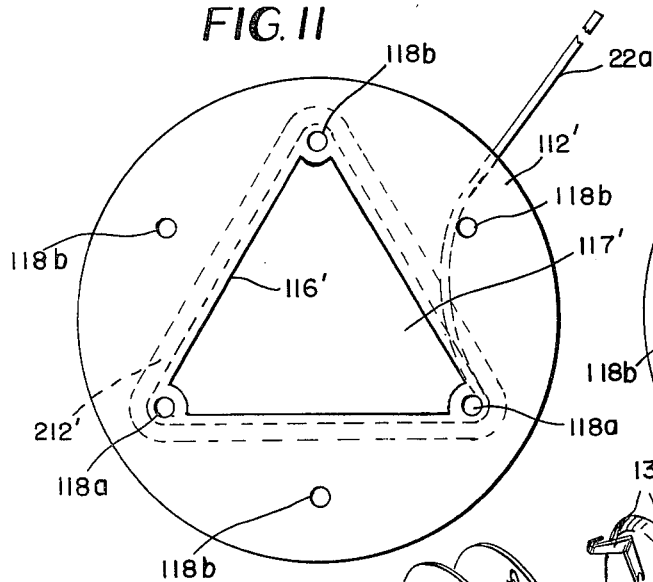
FIG. 14 is a plan view of the quick change cartridge shown in FIG. 13.
Figure 13:
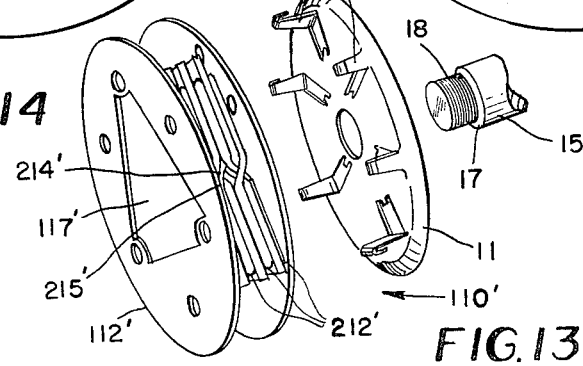
FIG. 13 is a perspective view of still another embodiment of the invention.

The lane switching concept disclosed with respect to the spool 211 can also be applied to a quick change cartridge 112 as shown in FIGS. 7-9. A quick change cartridge 112' modified to have a plurality of parallel channels or grooves 212' in its triangular core 116' is shown in FIGS. 13 and 14. A slot 214' would extend across the channels 212' to provide a gap for crossing over the filament from one channel to the next as shown at 215'. The cartridge 112' has a central opening 117' and apertures 118a and 118b serving the same function as the central opening 117 and apertures 118a and 118b of the cartridge 112 shown in FIGS. 7-9. The cartridge 112' would be assembled with a base plate 11 and mounted on a drive shaft 15 in the same manner as the cartridge 112 is assembled to a base plate 11 and mounted on a drive shaft.

Figure 15:
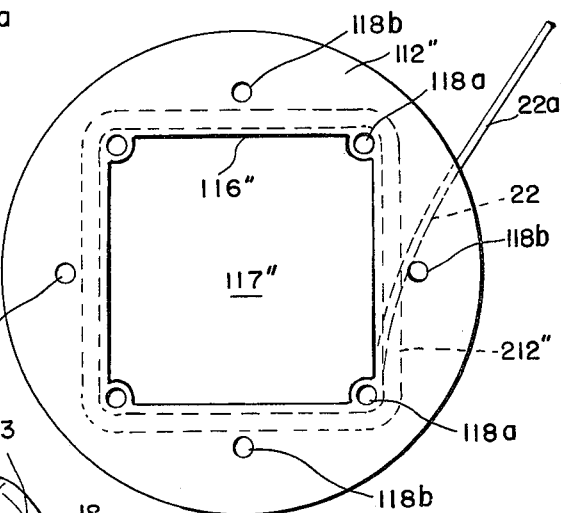
FIG. 15 is a plan view of another embodiment of a quick change cartridge in accordance with this invention.

FIG. 15 shows a quick change cartridge 112' having a square hub 116" and square grooves 212" in which a filament 22 is wound. A square hole 117" extends centrally through the hub and apertures 118a extend through the corners of the hub 116". Apertures 118b extend through the cartridge 112" outside of the hub 116". The cartridge 112" is adapted to be assembled with a base plate (not shown) but similar to the base plate 11 except that the base plate would have eight upstanding post-like members instead of six as shown on the base plate 11 in FIG. 3. The method of assemblying the cartridge 112" to a base plate is similar to the method of assemblying the cartridge 112 to its base plate 11 as described in connection with FIGS. 7 and 9.

Figure 16:
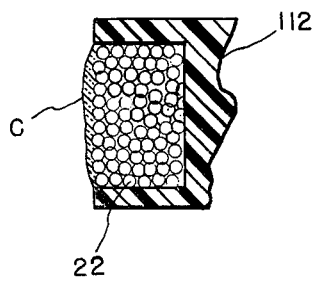
FIG. 16 is an enlarged fragmentary sectional view of a portion of the filament coil of a quick change cartridge such as shown in FIG. 8 wherein the filament coil is provided with a coating of wax or other low grade bonding agent to hold the filament windings locked in place.

In FIG. 16 a coating C, of wax or other low grade bonding agent, is shown applied to the outer layer of filament windings 22 on the cartridge 112. The coating C provides a temporary bond for the filament windings 22. The bond is easily ruptured to permit the automatic deployment of successive cutter end portions of the filament. While the coating C is shown applied to the filament windings on the cartridge 112, it is to be understood that a similar coating can be applied to the filament windings of the other cutter head embodiments disclosed herein.

The invention has been described in detail for the purpose of illustration but it will be obvious that numerous modifications and variations may be resorted to without departing from the spirit of the invention in its broadest aspect, as set forth in the appended claims.

Another feature of this invention is that some of the posts 13 on the base plate 11 may be provided with sharp edges while the remaining posts are provided with dull edges or have secondary bends or angles. If three of the alternate posts of the six-post plate 11 have sharp edges and the other three alternate posts have dull edges, then an operator can choose whether to position the filament coil over the sharp or the dull posts. If the filament coil is positioned about the sharp posts, then the posts with the dull edges remain outside of the coil and as the filament cutter end portion is automatically deployed outwardly it engages one of the posts with the dull edges. On the other hand, if the filament coil is positioned about the posts with the dull edges, then the posts with the sharp edges will remain outside of the coil and as the filament cutter end portion is automatically deployed outwardly it engages one of the posts with the sharp edges. If it is desired to have the line break away more quickly during light and soft grass cutting, then the operator installs the coil in a manner that exposes the cutter end portion of the filament to the sharp posts. If it is desired to have the line break away at longer rate intervals during tough, strong, heavy weed or grass cutting then the operator installs the coil over the opposite set of posts leaving the dull or secondary angled posts exposed to the automatically deployed cutter end portion of the filament.

The same selectivity of between sharp and dull posts may be provided with any cutter heads 10, 110, or 110'. With the cutter head 10 the filament may be hand coiled about either the three sharp posts or the three dull posts. With the cutter heads 110 and 110' the quick change cartridge may be positioned either over the sharp or the dull posts.

While the base plate 11 is shown as being of stamped sheet metal it is within the scope of this invention that the base plate may be made of other suitable materials and the post-like members 13 may be separately formed elements such as pins, posts, blades, wire etc., which are attached to the base plate by suitable means.

What is claimed is:

1. A vegetation cutter head assembly comprising a circular base, a plurality of upstanding post-like members circumferentially spaced on said base, a filament wound repeatedly about the outside of selected ones of said plurality of post-like members and inside of the remaining of said plurality of post-like members, a filament retainer plate positioned only over the post-like members about which said filament is wound for preventing the filament from slipping off the ends of said posts as said filament is wound about the outside of said posts, and a cover plate positioned over all of said post-like members and said retainer plate, said base plate, said filament retainer plate, and said cover plate having aligned central openings therein for receiving the end of a rotary drive shaft, said filament having a free end which projects outwardly from inside of one of said remaining post-like members, said circular base plate being formed of sheet metal and said post-like members are elongated strips stamped out of said base plate and bent substantially upright with respect to said base plate about an integral hinge line.

2. The vegetation cutter of claim 1 wherein said upstanding posts have medial reinforcing ribs adjacent said hinge line.

3. The vegetation cutter of claim 1 wherein each of said post-like members has a reversely bent free end.

4. A vegetation cutter head assembly comprising a circular base, a plurality of upstanding post-like members circumferentially spaced on said base, a filament wound repeatedly about the outside of selected ones of said plurality of post-like members and inside of the remaining of said plurality of post-like members, a filament retainer plate positioned only over the post-like members about which said filament is wound for preventing the filament from slipping off the ends of said posts as said filament is wound about the outside of said posts, and a cover plate positioned over all of said post-like members and said retainer plate, said base plate, said filament retainer plate, and said cover plate having aligned central openings therein for receiving the end of a rotary drive shaft, said filament having a free end which projects outwardly from inside of one of said remaining post-like members, said base plate having six upstanding post-like members and said filament retainer plate being triangular and provided with a corner opening in each of the three corners of said triangular retainer plate, said filament being wound around three alternate of said upstanding post-like members in a triangular coil, and said retainer plate being positioned over said triangular coil with the ends of said three alternate post-like members projecting through the three corner openings of said triangular retainer plate.

5. A vegetation cutter head assembly comprising a circular base, a plurality of upstanding post-like members circumferentially spaced on said base, a filament wound repeatedly about the outside of selected ones of said plurality of post-like members and inside of the remaining of said plurality of post-like members, a filament retainer plate positioned only over the post-like members about which said filament is wound for preventing the filament from slipping off the ends of said posts as said filament is wound about the outside of said posts, and a cover plate positioned over all of said post-like members and said retainer plate, said base plate, said filament retainer plate, and said cover plate having aligned central openings therein for receiving the end of a rotary drive shaft, said filament having a free end which projects outwardly from inside of one of said remaining post-like members, said cover plate having a circular edge and a plurality of equally spaced notches corresponding to the number of said post-like members, formed in said circular edge through which the ends of said post-like members extend.

6. A vegetation cutter head assembly comprising a circular base having a plurality of upstanding post-like members circumferentially spaced on said base, a quick change cartridge having a core, a filament wound repeatedly about said core to provide a plurality of windings and means for retaining said filament windings on said core, and means for detachably mounting said quick change cartridge on said base with selected of said plurality of upstanding post-like members spaced outside of the windings of said core, and means mounting the base and quick change cartridge for rotating and swinging a portion of the filament outwardly against one of said upstanding members during cutting, said core having a plurality of parallel circumferential grooves formed therein, and a slot extending across all of the grooves to provide a lane switching gap, said filament being wound upon said core within said grooves, said gap providing means whereby successive windings are switched from one groove to another as the filament is wound.

7. A vegetation cutter head assembly comprising a circular base having a plurality of upstanding post-like members circumferentially spaced on said base, a quick change cartridge having a core, a filament wound repeatedly about said core to provide a plurality of windings and means for retaining said filament windings on said core, and means for detachably mounting said quick change cartridge on said base with selected of said plurality of upstanding post-like members spaced outside of the windings of said core, and means mounting the base and quick change cartridge for rotating and swinging a portion of the filament outwardly against one of said upstanding members during cutting, said means for detachably mounting said cartridge on said base comprising a plurality of circumferentially spaced apertures extending through said cartridge, said apertures corresponding in number and position to the number and position of said upstanding post-like members on said base and each aperture being of a size and shape for receiving one of said upstanding post-like members therethrough, each of said upstanding post-like members having free ends opposite said base, and means on said free ends for detachably latching said cartridge to said base when said post-like members are inserted through said apertures, some of said circumferentially spaced apertures extending through said hub and others of said circumferentially spaced apertures being located in said cartridge outside of said hub.

8. The vegetable cutter head of claim 7 wherein said hub has plural lobes and said apertures which extend through said hub are located in said lobes.

9. The vegetable cutter head of claim 8 wherein said hub is trilobar and has six circumferentially spaced apertures and said base has six upstanding post-like members, three alternate of said post-like members being received through the apertures in the three lobes and the other three alternate post-like members being received through the apertures located located outside of said hub.

10. A rotary vegetation cutter head assembly comprising a circular base having a plurality of upstanding post-like members circumferentially spaced on said base, certain of said posts forming one set having a sharp edge and the remaining of said posts forming another set having a dull edge, a filament coil selectively positioned about either of said sets of posts in a manner so that an end portion of the filament coil upon rotation of the cutter head is automatically deployed outwardly to engage posts of the opposite set from the set about which the filament coil is positioned, means for mounting the base for rotating and swinging a portion of the filament and means for retaining the filament during cutting.

11. The cutter head of claim 10 wherein said filament coil is hand wound about a selected one of said sets of posts.

12. The cutter head of claim 10 wherein said filament is prewound on a quick change cartridge and said quick change cartridge is selectively positioned over one of said sets of posts.

* * * * *